US010399900B2

(12) United States Patent
Bar Moav

(10) Patent No.: US 10,399,900 B2
(45) Date of Patent: Sep. 3, 2019

(54) COMPOSITION AND METHOD OF USING PERLITE

(71) Applicant: SHAHAL BUILDING MATERIALS LTD., Beer Tovia (IL)

(72) Inventor: David Bar Moav, Rishon Letzion (IL)

(73) Assignee: Shahal Building Materials Ltd., Beer Tovia (IL)

( * ) Notice: Subject to any disclaimer, the term of this patent is extended or adjusted under 35 U.S.C. 154(b) by 0 days.

(21) Appl. No.: 15/637,185

(22) Filed: Jun. 29, 2017

(65) Prior Publication Data

US 2017/0297959 A1 Oct. 19, 2017

Related U.S. Application Data

(63) Continuation-in-part of application No. 14/527,085, filed on Oct. 29, 2014.

(30) Foreign Application Priority Data

Feb. 24, 2014 (IL) .......................................... 231135

(51) Int. Cl.
| | | |
|---|---|---|
| C09J 11/04 | (2006.01) | |
| C09J 11/08 | (2006.01) | |
| C04B 14/18 | (2006.01) | |
| C04B 28/04 | (2006.01) | |
| C04B 24/38 | (2006.01) | |
| C04B 16/06 | (2006.01) | |
| C04B 28/14 | (2006.01) | |
| C09D 1/08 | (2006.01) | |
| C04B 103/10 | (2006.01) | |
| C04B 111/00 | (2006.01) | |
| C04B 111/40 | (2006.01) | |
| C04B 111/28 | (2006.01) | |
| C04B 111/52 | (2006.01) | |

(52) U.S. Cl.
CPC .......... *C04B 14/18* (2013.01); *C04B 16/0633* (2013.01); *C04B 16/0641* (2013.01); *C04B 24/386* (2013.01); *C04B 28/04* (2013.01); *C04B 28/14* (2013.01); *C09D 1/08* (2013.01); *C04B 14/185* (2013.01); *C04B 2103/10* (2013.01); *C04B 2111/00086* (2013.01); *C04B 2111/00637* (2013.01); *C04B 2111/00672* (2013.01); *C04B 2111/28* (2013.01); *C04B 2111/40* (2013.01); *C04B 2111/52* (2013.01); *C04B 2201/30* (2013.01); *C09J 11/04* (2013.01); *C09J 11/08* (2013.01)

(58) Field of Classification Search
None
See application file for complete search history.

(56) References Cited

U.S. PATENT DOCUMENTS

| | | |
|---|---|---|
| 5,277,712 A | 1/1994 | McInnis |
| 7,625,960 B2 | 12/2009 | Garner |
| 7,736,574 B2 | 6/2010 | Heiman |
| 2007/0112098 A1 | 5/2007 | Heiman |
| 2015/0239780 A1* | 8/2015 | Bar Moav ............... C04B 28/04 523/219 |

FOREIGN PATENT DOCUMENTS

| | | | |
|---|---|---|---|
| CN | 101139186 | 3/2008 | |
| CN | 101 279 833 A | 10/2008 | |
| CN | 101279833 A * | 10/2008 | ............. C04B 28/02 |
| CN | 101 857 410 | 10/2010 | |
| CN | 102190464 | 9/2011 | |
| DE | 19540273 A1 * | 4/1997 | ............. C04B 28/10 |
| DE | 19540273 A1 | 4/1997 | |
| EP | 0839774 A1 | 5/1998 | |
| EP | 0829459 | 10/1999 | |
| GB | 1225755 A | 3/1971 | |
| WO | 2007056634 | 5/2007 | |
| WO | 2009019479 | 2/2009 | |
| WO | 2010059817 A2 | 5/2010 | |
| WO | 2011142639 | 11/2011 | |

OTHER PUBLICATIONS

Dow Construction Chemicals Cellulose Ethers Technical Overview and Product Guide. May 2012. (Year: 2012).*
Wacker webpage for Dispersible Polymer Powders. Retrieved on Apr. 27, 2017. (Year: 2017).*
Imerys Performance Materials, Imerys Product Overview for Perlite, Oct. 2010. (Year: 2010).*
Baumann et al., "New standards make greater demands—The impact of the new EN 12004 standard on formulation technology and raw materials for cement-based tile adhesives", EN 12004 standard was published around 2012 therefore it is assumed this document was published around 2012 (28 pages).
British Standard—BS EN 1348:2007; "Adhesives for tiles—determination of tensile adhesion strength for cementitious adhesives"; published in 2007 (11 pages).
British Standard—BS EN 998-1:2016; "Specification for mortar for masonry, Part 1: rendering and plastering mortar", published Nov. 30, 2016 (27 pages).
Dow Construction Chemicals Cellulose Ethers Technical Overview and Product Guide, May 2012 (8 pages).
Wacker website for Dispersible Polymer Powders, retrieved by the USPTO on Apr. 27, 2017 (2 pages).

(Continued)

*Primary Examiner* — Richard A Huhn
(74) *Attorney, Agent, or Firm* — Finnegan, Henderson, Farabow, Garrett & Dunner, LLP

(57) ABSTRACT

A powder adhesive composition having cement, a dispersible polymer powder; and at least 10% volume of the powder adhesive is an expanded perlite. The cement is at a ratio of between 600-1000% of the mass of the expanded perlite. The powder adhesive composition is an adhesive, and the adhesion strength of the adhesive, is over 0.4 MPa, after 28 days, and after water immersion for at least 20 days.

14 Claims, No Drawings

(56) References Cited

OTHER PUBLICATIONS

Adhesive Test Methods—2007 standards for adhesives which includes: EN 1346, EN 1308, EN 1347, EN 1348, and EN 12002 (17 pages).

* cited by examiner

COMPOSITION AND METHOD OF USING PERLITE

TECHNICAL FIELD

The present invention relates to the use of compositions containing expanded perlite. More particularly, the present invention relates to the use of compositions of expanded perlite for the construction industry.

BACKGROUND

Volcanic glass, such as perlite, forms when molten rock, i.e. lava, pours out of a volcano and rapidly cools. That rapid cooling inhibits crystal formation and permitting water to escape. Perlite is the lava that hardens immediately and contains 2-5% water.

Perlite is known in industry in two forms: crude and expanded. Crude perlite is prepared by the crushing and screening of perlite into various sized fractions. Expanded perlite is perlite after it has been heated. When heated, perlite can expand to as much as twenty times its original volume. This expansion is the result of heated water: when the glassy lava rock is heated to, for example, 890° C., the water molecules trapped in the rock turn into vapor which causes the rock to expand. That is similar to water that expands, when heated, in a corn kernel to create popcorn. It is the presence of these trapped water molecules in perlite which accounts for the physical properties of expanded perlite.

Expanded perlite can be manufactured to weigh between 32-240 kg/m$^3$, making it adaptable for numerous applications in the construction, industrial, chemical, horticultural and petrochemical industries.

U.S. Pat. No. 7,736,574 discloses a method for the production of perlite products such as sheets, panels or bricks. The disclosed method involves first providing a quantity of expanded perlite and treating the perlite by applying a cement binder thereto, so as to at least partially encapsulate the perlite with binder. Thereafter, an amount of cement is added to the binder-treated perlite and a mixture is created. The described mixture is then formed and allowed to harden to yield solid articles. Nevertheless, the disclosed method is used for yielding perlite based solid articles.

SUMMARY

It is an object of the present invention to provide a light weight composition for use in the construction industry.

It is another object of the present invention to provide a light weight adhesive, for attaching any natural or synthetic stone veneer.

It is still another object of the present invention to provide an ecological adhesive for gluing stone tiles, which has a long open time.

It is still another object of the present invention to provide an adhesive or plaster which has improved thermal and acoustic insulating properties.

Other objects and advantages of the invention will become apparent as the description proceeds.

The present invention relates to a powder adhesive composition comprising: (a) cement; (b) a dispersible polymer powder; and (c) at least 10% volume of the powder adhesive is an expanded perlite; wherein said cement is at a ratio of between 600-1000% of the mass of the expanded perlite; and wherein the powder adhesive composition is an adhesive, and the adhesion strength of the adhesive, is over 0.4 MPa, after 28 days, and after water immersion for at least 20 days.

Preferably, the composition further comprises a cellulose ethers compound,

Preferably, the composition further comprises a fiber compound.

Preferably, the cement is white cement.

In one embodiment, the cement is Portland cement.

In one embodiment, the composition further comprises an accelerator.

Preferably, the expanded perlite comprises at least 1% of the total mass of the composition.

Preferably, the dispersible polymer powder is a dispersible powder based on vinyl acetate.

Preferably, the fiber compound is a polypropylene compound.

Preferably, the adhesive composition is used for gluing a tile.

Preferably, the adhesive composition is used for gluing a stone tile.

Preferably, the adhesion strength of the adhesive, is between 0.5-1.5 MPa, after 28 days, and after water immersion for at least 20 days.

The present invention also relates to a method of producing a powder adhesive comprising the steps of: mixing expanded perlite, cement, and a dispersible polymer powder, in any order; wherein at least 30% volume of the sand-free powder adhesive is the expanded perlite.

The present invention also relates to a powder adhesive composition which comprises: gypsum; a retarder; a dispersible polymer powder based on vinyl acetate; and wherein at least 30% volume of the powder adhesive is an expanded perlite.

Preferably, the retarder is a modified polymer retardation.

DETAILED DESCRIPTION

Prior stone veneer powder adhesives, such as Sika Ceram-202, manufactured by Sika AG of Switzerland, or Mr. Fix 116 manufactured by Carmit Mr. Fix Ltd., of the United Kingdom for gluing ceramic tiles, typically have a density of more than 1400 kg/m$^3$. The heavy weight of these prior adhesives is due, inter alia, to the weight of the sand in the adhesive. The heavy weight of these prior adhesives is costly in terms of transportation and problematic in terms of handling, e.g. manual carrying. Furthermore, if the sand is not dried properly, before it is mixed into the adhesive, some of the adhesive's polymers can be ruined, effectively weakening the adhesive.

The term "adhesive" is meant to include hereinafter any composition that has an adhesion strength, after 28 days, of more than 0.4 megapascal (MPa).

Adhesive/Plaster Composition

An adhesive/plaster composition is proposed, for use in the construction industry, which uses expanded perlite. Unlike conventional adhesive compositions having sand as aggregate; in this embodiment, the volume of sand is substituted with an equal or equivalent volume of expanded perlite. In some versions, the adhesive is sand-free. The composition, which comprises expanded perlite, may be used for creating an adhesive, plaster, or any kind of material that hardens on drying and may be used for indoor and/or outdoor gluing on and/or coating walls, ceilings, floors, or for any other construction use. For example, the composition may be used as a powder adhesive, when mixed with water the resulting material can be used for gluing natural or synthetic stone tiles to a wall. Thus, for example, a powder adhesive composition for a stone veneer, which uses expanded perlite instead of sand, may have a density of approximately 500 kg/m$^3$, which results in a lighter weight, for the same volume, compared to a typical prior powder adhesive that may have a density greater than 1400 kg/m$^3$. The advantages of using expanded perlite instead of sand in powder adhesives or plaster in terms of improving the thermal and/or acoustic insulation properties of the adhesive and/or plaster are due to the expanded perlite's improved thermal and/or acoustic insulation properties that are discussed further at Table 1. The adhesive composition, which comprises expanded perlite, may have different consistencies such as powder, granular, cream, etc. The adhesive or plaster composition, which comprises expanded perlite, may be stored in sacks, bags, buckets, or any other known container. In particular, the expanded perlite comprises:

at least 10% of the total volume of the adhesive/plaster composition;
at least 30% of the total volume of the adhesive/plaster composition
at least 70% of the total volume of the adhesive/plaster composition;
at least 80% of the total volume of the adhesive/plaster composition; or
at least 90% of the total volume of the adhesive/plaster composition.

Examples of the above total volume of the adhesive/plaster compositions are described in greater detail below.
Adhesive/Plaster Composition with Vermiculite Alternatively, expanded vermiculite may be used instead of expanded perlite as set forth in the above-identified paragraph regarding the adhesive/plaster compositions. Vermiculite is a hydrous silicate mineral that (a) is classified as a phyllosilicate and (b) expands greatly when heated. Vermiculite may be formed by weathering or hydrothermal alteration of biotite or phlogopite.
Powder, Light Weight Stone Veneer Adhesive A first powder, light weight, stone veneer adhesive has
(a) expanded perlite in at least 70 volume percent of the adhesive;
(b) cellulose ether compounds at a ratio of between 7-15% of the mass of the expanded perlite;
(c) a dispersible polymer at a ratio of between 17%-180% of the mass of the expanded perlite;
(d) a fiber compound at a ratio of between 0.9-1.1% of the mass of the expanded perlite;
(e) an accelerator at a ratio of between 5-15% of the mass of the expanded perlite; and,
(f) optionally, cement at a ratio of between 600%-900% of the mass of the expanded perlite.

The components of the instant adhesive can be mixed together in any order to obtain the desired adhesion strength, of the adhesive, which is over 0.4 MPa, after 28 days, and after water immersion for at least 20 days. Preferably, the adhesion strength is between 0.5-1.5 MPa, after 28 days, and after water immersion for at least 20 days.

A second powder, light weight, stone veneer adhesive has
(a) expanded perlite in at least 1% of the mass of the adhesive;
(b) cellulose ether compounds at a ratio of between 5-25% of the mass of the expanded perlite;
(c) a dispersible polymer at a ratio of between 10-250% of the mass of the expanded perlite;
(d) a fiber compound at a ratio of between 0.6-15% of the mass of the expanded perlite;
(e) an accelerator at a ratio of between 3-25% of the mass of the expanded perlite; and,
(f) optionally, cement at a ratio of between 600-1000% of the mass of the expanded perlite.

The components of the instant adhesive can be mixed together in any order to obtain the desired adhesion strength, of the adhesive, which is over 0.4 MPa, after 28 days, and after water immersion for at least 20 days. Preferably, the adhesion strength is between 0.5-1.5 MPa, after 28 days, and after water immersion for at least 20 days.

In some embodiments, the powder, light weight, stone veneer adhesive is a sand free adhesive.

A third powder, light weight, sand free, stone veneer adhesive has
expanded perlite in at least 10% volume of the powder adhesive;
cellulose ether compounds at a ratio of between 5-25% of the mass of the expanded perlite;
a dispersible polymer at a ratio of between 10-250% of the mass of the expanded perlite;
a fiber compound at a ratio of between 0.6-15% of the mass of the expanded perlite;
an accelerator at a ratio of between 3-25% of the mass of the expanded perlite; and,
optionally, cement at a ratio of between 600-1000% of the mass of the expanded perlite.

The components of the instant adhesive can be mixed together in any order to obtain the desired adhesion strength, of the adhesive, which is over 0.4 MPa, after 28 days, and after water immersion for at least 20 days. Preferably, the adhesion strength is between 0.5-1.5 MPa, after 28 days, and after water immersion for at least 20 days.

The described adhesives may be mixed with water for creating a glue having cream like texture, which hardens on drying. Due to the expanded perlite's intrinsic characteristics, water may be added to the powder adhesive composition in the mass ratio of approximately 0.8:1, for example, meaning, that approximately 0.8 liter of water may be added for each 1 kg of powder; 0.9:1; 0.7:1; 0.6:1; or 1:1. Water could also be added to the powder adhesive composition in the ratio of between 60-100% of the mass of the powder adhesive composition. The ration of water added to the adhesive powder may also be a function of the specific ingredients of the adhesive powder. The adhesive, with or without cement, may be used for gluing any stone tiles as a protective and/or decorative covering for exterior or interior horizontal or vertical surfaces.

The composition, comprising expanded perlite, is used for creating a lightweight powder veneer adhesive. The term veneer is meant to include any protective or ornamental facing which can be adhesively attached to any horizontal or vertical surface. The adhesive may be used for adhesively attaching stone such as granite, porcelain, ceramic, mosaic, porcelain, marble, brick, or any other synthetic or natural stone to a wall, ceiling, floor or any other surface. The powder adhesive is mixed with water for creating a cream like textured glue, which hardens on drying. The glue may be used for adhesively attaching any stone tiles as a protective and/or decorative covering for exterior or interior horizontal or vertical surfaces. The powder adhesive composition, for attaching stone veneer, comprises First Component:
at least 1% of expanded perlite of its total mass;
at least 3% of expanded perlite of its total mass;
at least 6% of expanded perlite of its total mass; or
at least 9% of expanded perlite of its total mass.

Preferably, the expanded perlite, used in the adhesive composition, has the following characteristics:

(A) a granular size of between 0.01 to 2 mm, and a density that includes and is between 50-115 kg/m$^3$;
(B) a granular size of between 2 to 6 mm and a density that includes and is between 40-50 kg/m$^3$;
(C) a granular size of between 0.01 to 6 mm and having a density that includes and is between 40-115 kg/m$^3$.

For example, the physical properties of the expanded perlite that can be used for creating a powder adhesive composition for attaching stone tiles is disclosed at Table 1:

TABLE 1

| | |
|---|---|
| Spatial weight | 40-115 kg/m$^3$ |
| Color | White |
| Refractive Index | 1.4-1.5 |
| Granular Size | From fine powder to 6 mm |
| pH | 7-8 |
| Softening Point | 890-1100° C. |
| Fusion Point | 1280-1350° C. |
| Specific Heat | 387 J/kg · K |
| Thermal Conductivity | 0.04 W/m · K |

In practice, the expanded perlite, used in the adhesive composition, can be derived from different sources, and have other physical properties.

The use of expanded perlite instead of sand in construction compositions may also benefit the environment as the perlite is a natural and ecological substance. The use of expanded perlite instead of sand in powder adhesives or plaster can also improve the thermal and/or acoustic insulation properties of the adhesive and/or plaster due to the expanded perlite's improved thermal and/or acoustic insulation properties.

Second Component:

A cellulose ethers compound, preferably, Mecellose FMC 21010 manufactured by Samsung Chemical; Methocel, which is water-soluble methylcellulose and has hydroxypropyl methylcellulose polymers, any other cellulose ether that is made for use with cement and mixtures thereof. The cellulose ethers compound enhances some of the qualities of the adhesive composition such as providing workable quality to the composition and/or extending the open time of the composition, and/or improving the water saturation of the composition, where open time is the time after the adhesive is applied during which a serviceable bond can be made. The cellulose ethers are added to the adhesive composition at a ratio of between 5-25% of the mass of the expanded perlite,
7%-15% of the mass of the expanded perlite;
30-40% of the mass of the expanded perlite.

Third Component

A dispersible polymer, preferably, Wacker's Vinnapas 5025L, which is a leveling dispersible powder based on vinyl acetate and ethylene, or may be any other dispersible powder based on vinyl acetate, or any other hydroscopic compound which is dispersible in water, such as SBR-based adhesives, vinyl acetate, acryl, etc. The dispersible polymer is added to the adhesive composition at a ratio of between 10%-250% of the mass of the expanded perlite;
200-250% of the mass of the expanded perlite;
5-300% of the mass of the expanded perlite.

Fourth Component

A fiber compound such as Adfil construction fibres or any other polypropylene compound having a fiber length of 6 mm or any other chemical or synthetic fiber compound which may be used for cement based adhesives, or any other fiber that is used with cement such as nylon fiber. Preferably, the fiber compound may be added to the adhesive composition at a ratio of between 0.6-15% of the mass of the expanded perlite; or
0.6-0.9% of the mass of the expanded perlite.

Fifth Component—Optional

Cement such as white cement, Portland cement, or any type of cement or aluminous cement. Preferably, the cement may be added to the adhesive composition at a ratio of between 600-1000% of the mass of the expanded perlite;
800-950% of the mass of the expanded perlite;
250-1700% of the mass of the expanded perlite;
350-900% of the mass of the expanded perlite; or
350-1700% of the mass of the expanded perlite.

As indicated above, the adhesive composition, comprising expanded perlite, may be free of cement. The resulting adhesive composition free of cement is a light weight adhesive used for indoors gluing. This adhesive may be sold as a cream adhesive.

Sixth Component

Gypsum and a retarder such as HYCON R 7200, manufactured by BASF, or any other modified polymer retardation instead of cement. The gypsum may be added to the adhesive composition at a ratio of between 600-900% of the mass of the expanded perlite, and the retarder may be added in relations to the desired open time.

Seventh Component

The adhesive for attaching veneer may also comprise an additive for accelerating the bonding time of the adhesive, referred to hereinafter as accelerator. The accelerator may be Calcium Formate, Calcium Chloride, or any other additive that can be used for accelerating the bonding time of the adhesive. The accelerator may be added to the adhesive composition at a ratio of between 5-15% of the mass of the expanded perlite.

Process Steps

The expanded perlite and all the other component ingredients, mentioned above, of the adhesive composition, may be mixed together in any order to form a powder adhesive composition.

The above-identified powder adhesive composition may be mixed with water to create glue for gluing any synthetic or natural stone tile to any surface. Due to the expanded perlite's intrinsic characteristics, water may be added to the powder adhesive composition in the mass ratio of approximately 0.7:1, meaning that approximately 0.7-1 liter of water can be added for each 1 kg of powder, to approximately 1:1. That means, water may be added to the powder adhesive composition in the ratio of between 70-100% of the mass of the powder adhesive composition. Alternatively, water may be added to the powder adhesive composition in the mass ratio of approximately 0.6:1 to approximately 1:1. In other words, water may be added to the powder adhesive composition in the ratio of between 60-100% of the mass of the powder adhesive composition.

The resulting adhesive composition that complies with this disclosure has an adhesion strength (A) over 0.5 MPa, after 28 days;
(B) over 1 MPa, after 28 days;
(C) between 0.5-1.5 MPa, after 28 days,
(D) between 0.5-1 MPa, after 28 days,
(E) (i) over 0.5 MPa, after 28 days; over 1 MPa, after 28 days; between 0.5-1.5 MPa, after 28 days, or between 0.5-1 MPa, after 28 days and (ii) after the adhesive has been immersed in water;

(F) (i) over 0.5 MPa, after 28 days; over 1 MPa, after 28 days; between 0.5-1.5 MPa, after 28 days, or between 0.5-1 MPa, after 28 days and (ii) after the adhesive has been immersed in water for at least 1 day; and (G) (i) over 0.5 MPa, after 28 days; over 1 MPa, after 28 days; between 0.5-1.5 MPa, after 28 days, or between 0.5-1 MPa, after 28 days and (ii) after the adhesive has been immersed in water for at least 20 days.

EXAMPLES

An adhesive example is set forth at Table 2, with ingredients and their approximated amounts for creating a powder adhesive composition, which comprises expanded perlite, for attaching stone tiles:

TABLE 2

| Perlite | 820 g |
| White Cement | 7.38 Kg |
| Methocel | 100 g |
| Vinaps 5025L | 0.6 Kg |
| poly propylene | 10 g |

By mixing the exemplified ingredients and amounts, of Table 2, then a powder adhesive composition of about 9 kg is created. Water, for example and not limited to 7.5 liters, is added to this powder adhesive composition to create a glue that is used to adhere the stone veneer or tiles to a surface after which the glue cures and the tiles stay attached to the surface henceforth.

The mixing of the exemplified ingredients and amounts identified at table 2 create an adhesive that complies with the properties C2 TE S1 of any of the European adhesive standards: EN 1346 (2007), EN 1308 (2007), EN 1347 (2007), EN 1348 (2007), or EN 12002 (2008). Those standards are available on http://www.techstreet.com or http://shop.bsigroup.com.

Lab tests of the above disclosed example powder adhesive composition reveal the following characteristics of the composition:

TABLE 3

| Density (wet) | 1000 kg/m³ |
| Preferred Water to powder relation | 0.9 liter water for 1 kg powder |
| Effective work time | 90 minutes |
| Open time | 30 minutes |
| Cover capability | 2.6 Kg/m² for 5 mm thickness |
| adhesion strength after 28 days | 0.5-1.5 megapascal MPa |
| Working temperature | 5° C.-35° C. |

Thus, as conveyed at Table 3, the powder adhesive composition weighs less than the typical prior art powder adhesive. That decreased weight reduces costs of transportation and handling. In addition, the use of expanded perlite instead of sand in the powder adhesives prolongs the open time of the adhesive, after the water is added, effectively making the perlite based adhesive more comfortable for use.

Lab tests that use the above-identified powder adhesive composition reveal the following characteristics of the composition:

TABLE 4

| Density (dry mix) | 500 kg/m³ |
| Preferred Water to powder relation | 1 liter water for 1 kg powder |
| Effective work time | 90 minutes |
| Open time | 45 minutes |

TABLE 4-continued

| Cover capability | 2.6 Kg/m² for 5 mm thickness |
| adhesion strength after 28 days | 0.5-1.5 megapascal MPa |
| Working temperature | 5° C.-35° C. |

Table 4 conveys the described adhesive complies with the known adhesive properties of: C1, C1 T, C1 TE, C1 TE S1, C1 TE S2, C2, C2 T, C2 TE, C2 TE S1, or C2 TE S2 of any of the European standards such as: EN 1346 (2007), EN 1308 (2007), EN 1347 (2007), EN 1348 (2007), or EN 12002 (2008) available on http://www.techstreet.com or http://shop.bsigroup.com.

Experimental Reports

Experiment No. 1

At CN 101279833 A, Jieru described a mortar composition. Jieru's mortar composition is compared with this application's claimed adhesive composition. In particular, Jieru discloses an insulation mortar for use in masonry or plastering. Jieru's mortar is based on the composition disclosed in the abstract and in the summary of CN 101279833 A while the proposed adhesive is based on one of the embodiments, with the understanding that both compositions have the same total volume for comparison purposes:

TABLE 5

| ingredients | Jieru's composition | | Proposed adhesive | |
|---|---|---|---|---|
| cement | 4.5 Kg | 50% | 7.240 Kg | 83% |
| coal ash | 1.44 Kg | 16% | 0 | |
| dispersible polymer + defoamer | 0.225 Kg | 2.5% | 0.6 Kg | 6.8% |
| wood fiber | 0.027 Kg | 0.3% | 0 | |
| fiber compound | 0.009 Kg | 0.1% | 0.015 Kg | 0.17% |
| calcium formate | 0.045 Kg | 0.5% | 0 | |
| cellulose ethers | 0.054 Kg | 0.6% | 0.1 Kg | 1.1% |
| sulphonated polycondensahon (water repellent + multifunctional additives) | 0.036 Kg | 0.4% | 0 | |
| expanded perlite | 2.7 Kg | 30% | 0.82 Kg | 9.3% |

Results:

Jieru's composition is an insulation mortar composition that has an adhesion strength between 0.07-0.1 MPa (as measured in accordance to the EN 998-1:2016 standard available at http://www.techstreet.com/standards/bs-en-998-1-2016?product_id=1936338). In contrast, the adhesion strength of the proposed adhesive is between 0.5-1.5 MPa, after 28 days, and after water immersion for at least 20 days as measured in accordance to the EN 1348:2007 standard available at http://www.techstreet.com/standards/bs-en-1348-2007?product_id=1533195). Accordingly, Jieru's composition does not and cannot meet the minimum requirements of the claimed invention.

Experiment No. 2

GB 1225755 discloses a cement-based adhesive. For the sake of brevity, the Comparative Examples A-C of GB 1225755 have been tested. The compositions comprised the following amounts of components:

TABLE 6

| Example | A (kg) | B (kg) | C (kg) |
|---|---|---|---|
| White Portland "Snowcrete" Cement | 4.41 cimbeton | 4.470 cimbeton | 4.450 cimbeton |
| Expanded unmilled perlite grade 100/28 | 0.360 agrikal | 0.540 agrikal | 0.720 agrikal |
| Powdered Limestone | 3.915 stone&lime | 3.915 stone&lime | 3.915 stone&lime |
| Vinyl acetate copolymer | 0.225 5044 vinapas | 0.225 5044 vinapas | 0.225 5044 vinapas |
| Methyl hydroxypropyl cellulose | 0.090 Mp 75 h weikem | 0.090 Mp 75 h weikem | 0.090 Mp 75 h weikem |
| Water | 8.0-9.0 lt | 8.0-9.0 lt | 8.0-9.0 lt |
| Cement: perlite mass ratio (%) | 1225 | 780 | 560 |

The compounds disclosed in Table 6 were compared to an example according to the present invention having the following amounts of components that conform to the teachings of the claimed invention (see Table 7):

TABLE 7

| Proposed adhesive | Components: |
|---|---|
| White Cement | 7380 g |
| Expanded perlite | 850 g |
| Vinnaps 5025L | 600 g |
| Methocel | 100 g |
| Polypropylene | 10 g |
| Water | 6.5-7.0 lt |
| Cement: perlite mass ratio (%) | 870 |

Analysis of Compositions:

The adhesive strength of the compositions prepared above were analysed according to the standard EN 1348 August 2007. The extended open time of the compositions prepared above were analysed according to the standard EN 1346 August 2007

Results:

TABLE 8

| Example | Adhesive strength (MPa) | Extended open time (minutes) |
|---|---|---|
| Comparative A | 0.2 in water (failed all test) | 18 (failed) |
| Comparative B | 0.17 in water (failed all test) | 19 (failed) |
| Comparative C | 0.14 in water (failed all test) | 19 (failed) |
| Present invention | 1.1 in water | 30 m (as necessary) |

As conveyed at Table 8, GB 1225755's cement-based adhesive fails to meet the minimum requirements of the claimed invention.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A sand-free powder adhesive composition comprising:
   cement;
   an expanded perlite, which comprises at least 10% volume of the powder adhesive composition; and
   a dispersible polymer comprising 200-250% of the mass of the expanded perlite,
   said cement comprising 800-950% of the mass of the expanded perlite.

2. The composition of claim 1, wherein the expanded perlite has a granular size of 0-2 mm.

3. The composition of claim 1, wherein the expanded perlite has a density of 50-115 kg/m$^3$.

4. The composition according to claim 1, further comprising a cellulose ethers compound.

5. The composition according to claim 4, where the cellulose ethers compound is a water-soluble methylcellulose having hydroxypropyl methylcellulose polymers.

6. The composition according to claim 1, further comprising a fiber compound.

7. The composition according to claim 6, where the fiber compound is a polypropylene compound.

8. The composition according to claim 1, where the cement is white cement.

9. The composition according to claim 1, where the cement is Portland cement.

10. The composition according to claim 1, further comprising an accelerator.

11. The composition of claim 10, wherein the accelerator comprises calcium formate, calcium chloride, or combinations thereof.

12. A sand-free powder adhesive composition comprising:
    cement;
    a dispersible polymer powder;
    an expanded perlite, which comprises at least 10% volume of the powder adhesive composition; and
    a fiber compound which comprises a ratio of 0.6-0.9% of the mass of the expanded perlite,
    said cement comprising 800-950% of the mass of the expanded perlite.

13. A sand-free powder adhesive composition comprising:
    cement;
    a dispersible polymer powder;
    an expanded perlite, which comprises at least 10% volume of the powder adhesive composition; and
    a cellulose ethers compound which comprises a ratio of 30-40% of the mass of the expanded perlite,
    said cement comprising 800-950% of the mass of the expanded perlite.

14. A sand-free powder adhesive composition comprising:
    cement;
    a dispersible polymer powder;
    an expanded perlite, which comprises at least 10% volume of the powder adhesive composition; and
    an accelerator comprising calcium formate, calcium chloride, or combinations thereof, wherein said accelerator comprises a ratio of 5-15% of the mass of the expanded perlite,
    said cement comprising 800-950% of the mass of the expanded perlite.

* * * * *